(12) United States Patent
Sankaran

(10) Patent No.: US 9,336,454 B2
(45) Date of Patent: May 10, 2016

(54) VECTOR PROCESSOR CALCULATION OF LOCAL BINARY PATTERNS

(71) Applicant: TEXAS INSTRUMENTS INCORPORATED, Dallas, TX (US)

(72) Inventor: Jagadeesh Sankaran, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 409 days.

(21) Appl. No.: 13/921,778

(22) Filed: Jun. 19, 2013

(65) Prior Publication Data

US 2014/0355893 A1 Dec. 4, 2014

Related U.S. Application Data

(60) Provisional application No. 61/829,640, filed on May 31, 2013.

(51) Int. Cl.
*G06K 9/00* (2006.01)
*G06K 9/46* (2006.01)
*H04N 9/80* (2006.01)

(52) U.S. Cl.
CPC ...... *G06K 9/4604* (2013.01); *G06K 2009/4666* (2013.01)

(58) Field of Classification Search
USPC ......... 382/100, 103, 106–107, 123, 140, 154, 382/162, 168, 173, 181, 190–194, 199, 209, 382/224, 232, 254, 274, 276, 286–295, 305, 382/312, 159, 118; 386/239
See application file for complete search history.

(56) References Cited

U.S. PATENT DOCUMENTS

| | | | | |
|---|---|---|---|---|
| 8,457,469 | B2 * | 6/2013 | Suzuki ............... | G06K 9/00711 386/239 |
| 8,582,836 | B2 * | 11/2013 | Niskanen ........... | G06K 9/00228 382/118 |
| 2013/0223683 | A1 * | 8/2013 | Jiang .................... | G06K 9/4638 382/103 |
| 2013/0308855 | A1 * | 11/2013 | Li ....................... | G06K 9/00221 382/159 |
| 2014/0355893 | A1 * | 12/2014 | Sankaran ............. | G06K 9/4604 382/224 |

* cited by examiner

*Primary Examiner* — Seyed Azarian
(74) *Attorney, Agent, or Firm* — Robert D. Marshall, Jr.; Frank D. Cimino

(57) ABSTRACT

A method (and system) of determining a local binary pattern in an image includes selecting an orientation. For each pixel in the image, the method further includes determining a binary decision for each such pixel relative to one neighboring pixel of the orientation, selecting a new orientation, and repeating the determination of the binary decision for each pixel in the image relative to one neighboring pixel of the newly selected orientation.

16 Claims, 5 Drawing Sheets

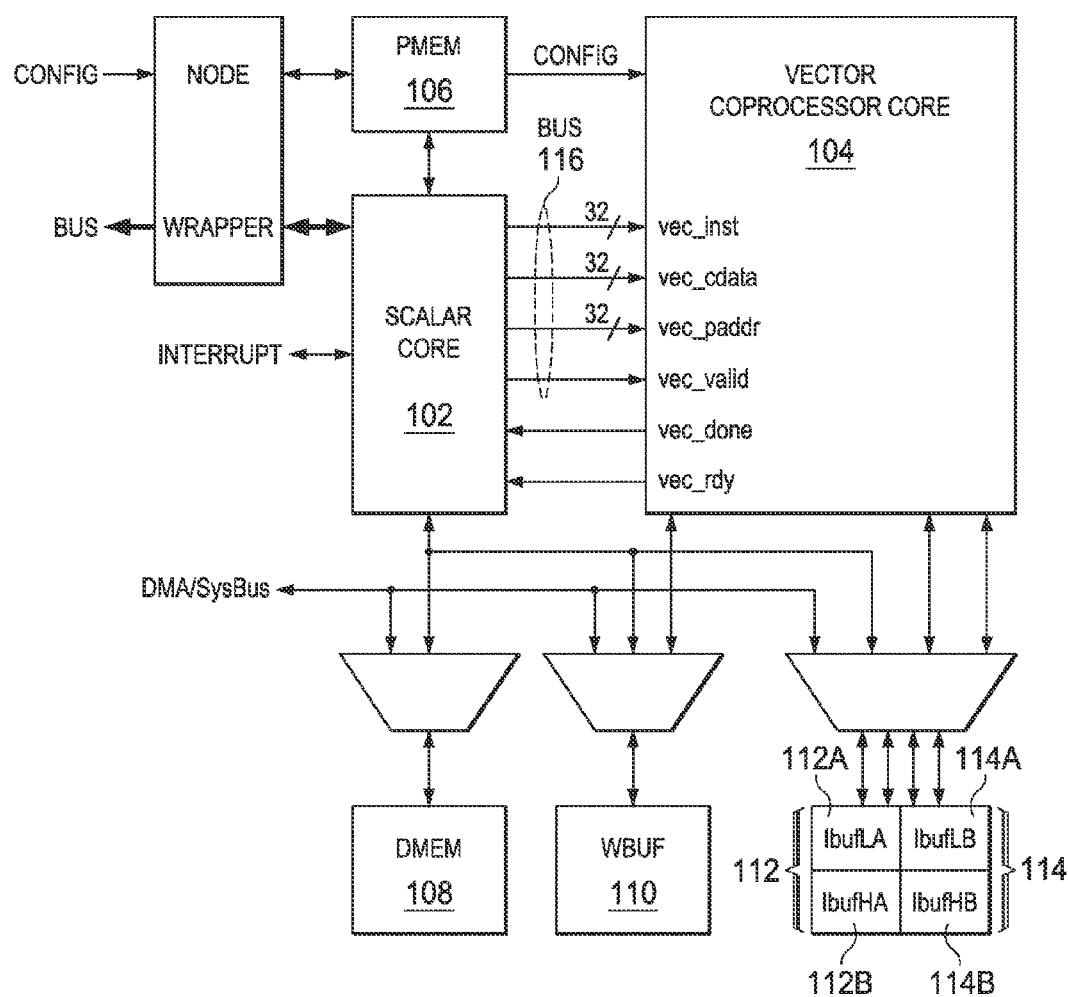

VECTOR PROCESSOR CALCULATION OF LOCAL BINARY PATTERNS

CROSS-REFERENCE TO RELATED APPLICATION

This application claims priority to U.S. Provisional Appln. No. 61/829,640 titled "Vector Processor Calculation of Local Binary Patterns," filed May 31, 2013 and incorporated herein by reference.

BACKGROUND

A local binary pattern (LBP) is a type of feature used for classification in, for example, computer vision. Originally developed for texture classification, LBP has been extended to other types of vision classification. Unfortunately, LBP is processor and memory bandwidth intensive.

BRIEF DESCRIPTION OF THE DRAWINGS

For a detailed description of exemplary embodiments of the invention, reference will now be made to the accompanying drawings in which:

FIG. 3 shows a block diagram of a system usable to compute the LBP in accordance with the disclosed principles;

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
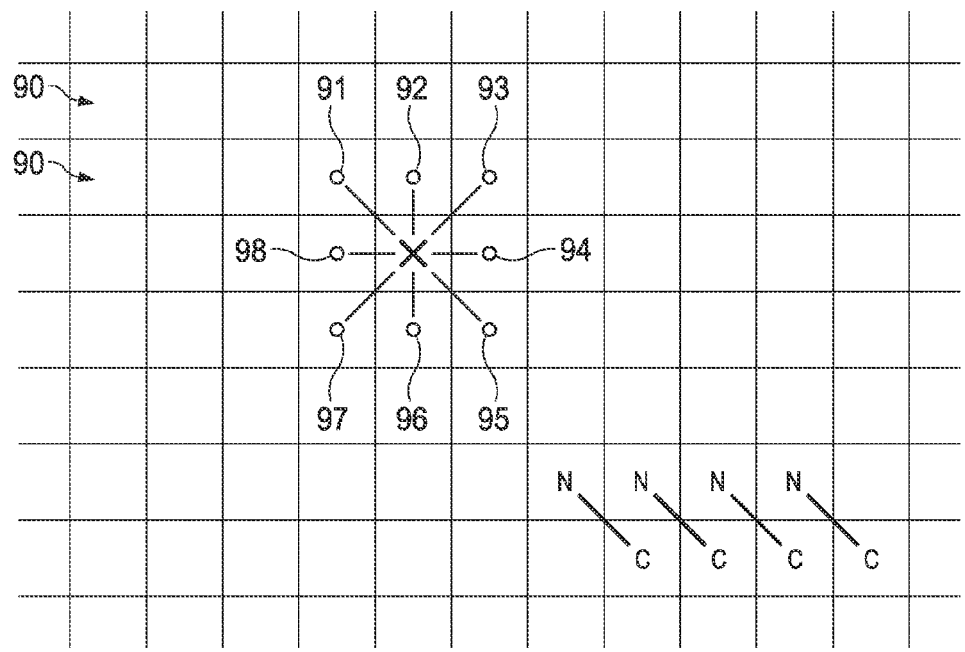
FIG. 1 illustrates pixels in an image and neighboring pixels to compute a local binary pattern (LBP)
Figures 2A, 2B, 2C, 2D:
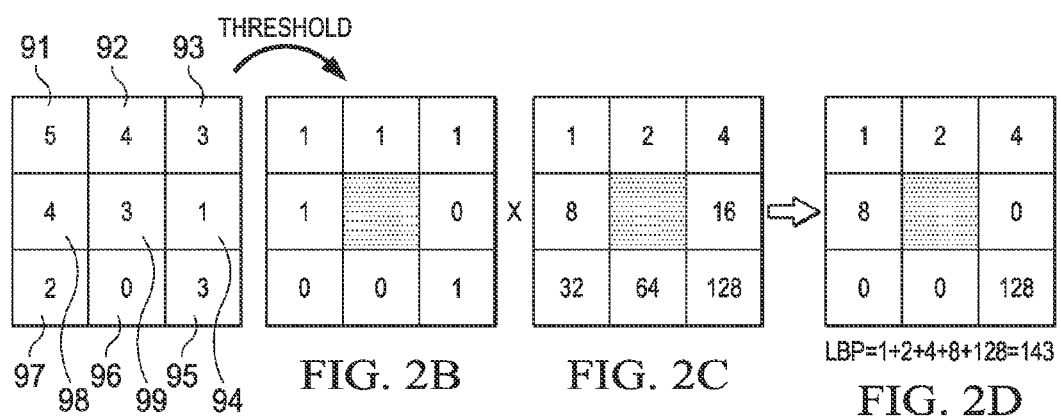
FIGS. 2A-2D illustrate an LBP calculation.

The local binary pattern (LBP) operator processes a number of pixels in the vicinity of a "center" pixel. FIG. 1, for example, illustrates a plurality of pixels 90 forming an image. Each pixel 90 is represented by a value that includes or encodes an intensity level. For each pixel 90 (e.g., the pixel designated by an "X"), the pixel is compared to various neighbors of the pixel. In the example of FIG. 1, center pixel X is compared to its adjacent eight neighboring pixels 91-98 to compute an LBP value. FIG. 2 shows an example of the LBP computation for a given center pixel X (designed as pixel 99 in FIG. 1). In the example of FIG. 2A, the center pixel 99 has an intensity value of 3. Upper left pixel 91 has an intensity value of 5. Upper middle pixel 92 has an intensity value of 4 and upper right pixel 93 has an intensity value of 3. Middle right pixel 94 has an intensity value of 1. Lower right pixel 95 has an intensity value of 3. Middle bottom and lower left pixels 96 and 97 have intensity values of 0 and 2, respectively. Middle left pixel 98 has an intensity value of 4. As can be seen, center pixel 99 (intensity value of 3) is greater than middle right pixel 94 (intensity value 1) and middle bottom and lower left pixels 96 and 97. The center pixel is compared to each of its neighboring pixels. The results of such binary comparisons are shown in FIG. 2B. The result of the comparison is a 1 if the center pixel is less than or equal to the neighboring pixel or a 0 if the center pixel is greater than the neighboring pixel.

The comparison results (FIG. 2B) are weighted (e.g., multiplied by) corresponding weights (FIG. 2C). FIG. 2D shows the results of the weighting (multiplication) process. An LBP value is then computed by adding together the resulting weighted comparisons. In the example of FIG. 2D, the LBP value is 143. The example of FIGS. 1 and 2A-2D show each center pixel being compared to its eight immediate neighbors. In this example, the "radius" of the LBP computation is 1 meaning that, from the center pixel, the LBP process seeks out and uses neighboring pixels that are adjacent the center pixel in question. A value "P" represents the number of pixels used in the comparison process. In the example of FIGS. 1 and 2A-2D, the value of P is 8 as eight neighboring pixels are used. In general, the radius can be greater than or equal to 1 and P can be other than 8. For each center pixel, the LBP process performs P compares and P aggregations of binary decisions.

The process described above is repeated for each pixel in the image. An image that has a resolution of 1280×1024 pixels results in over 1.3 million repetitions of the above LBP computation process and generally heavily uses memory thereby placing a significant burden on the memory bandwidth. The disclosed embodiments use a vector processor with multiple memory ports to alleviate this burden and make the LBP computation more efficient.

Any suitable vector processor can be used in this regard. FIG. 3 illustrates one suitable example of a machine with a vector processor suitable to more efficiently performing LBP computations. The following discussion describes the illustrative machine and vector processor followed by a description of the process for determining and storing the binary decisions to memory.

FIG. 3 shows a block diagram of a processor 100 in accordance with various embodiments. The processor 100 includes a scalar processor core 102, a vector coprocessor core 104 (also referred to as a "vector processor"), a program memory 106, a data memory 108, a working buffer memory 110, an A buffer memory 112, and a B buffer memory 114. The A and B buffer memories 112, 114 are partitioned into a low and high A buffer memory (112A, 112B) and a low and high B buffer memory (114A, 114B) to allow simultaneous direct memory access (DMA) and access by the cores 102, 104. To support N-way processing by the vector coprocessor core 102, each of the working buffer memory 110 (WBUF), A buffer memory 112, and B buffer memory 114 may comprise N simultaneously accessible banks. For example, if the vector coprocessor core 104 is an 8-way single-instruction multiple-data (SIMD) core, then each of the working, A, and B buffers 110, 112, 114 may comprise 8 banks each of suitable word width (e.g., 32 bits or more wide) that are simultaneously accessible by the vector coprocessor core 104. A switching network provides signal routing between the memories 108, 110, 112, 114 and the various systems that share access to memory (e.g., DMA and the processor cores 102, 104). Each memory couples to the vector coprocessor via a "lane."

Additional detail regarding a suitable vector processor can be found in patent application Ser. No. 13/548,924 titled "Processor With Multi-Level Looping Vector Coprocessor," incorporated herein by reference.

FIGS. 4-7 illustrate methods for determining the LBP binary decisions on a vector processor in accordance with the preferred embodiments of the invention. The vector processor is capable of accessing data (loads and stores) in multiple banks of memory simultaneously across multiple lanes. At the outset of the method, the pixel data is arranged in contiguous, raster fashion in memory (e.g., in WBUF 110).

The method preferably performs similar operations on groups of center pixels. For example, each of a group of center pixels is compared to a neighboring pixel of the same orientation. In the example of FIG. 1, for example, the four center pixels C in the lower right corner of the figure are each compared to an upper left pixel designated by an N as shown. Each center pixel in the image is compared to one neighboring pixel of a given orientation to generate a binary result. This process is repeated for each of the remaining orientations.

The vector processor 104 in some embodiments can load 256 bits at a time across the various lanes. Accordingly, the vector processor can concurrently load a group of center pixels, and also load a corresponding group of neighboring pixels for the comparison. Pointers are incremented to load the next consecutive group of pixels and neighboring pixels to perform the comparison based on the same orientation. The process repeats until all pixels in the image have been compared to a neighboring pixel of a given (i.e., same) orientation. Then, the pixels of the image are again compared to neighboring pixels of the next orientation. For P equals 8 (eight neighboring pixels to be compared to each center pixel), for example, all pixels of the image are compared to neighboring pixels of one of the eight orientations. The same image pixels are again compared to neighboring pixels of the second orientation, and so on. The process is performed eight times in order to have each pixel compared to its eight neighbors. In some embodiments, the vector processor 104 can load 16 pixels at a time from memory and thus 16 center pixels at a time are compared to 16 neighboring pixels.

In some embodiments, the vector processor 104 may load more pixel data than is needed for a given comparison. For example, the vector processor 104 may be able to load twice as many center pixels as are compared to neighboring pixels in a given cycle. The ability to load additional center and neighboring pixels increases the efficiency of the LBP computation process.

Figure 4:
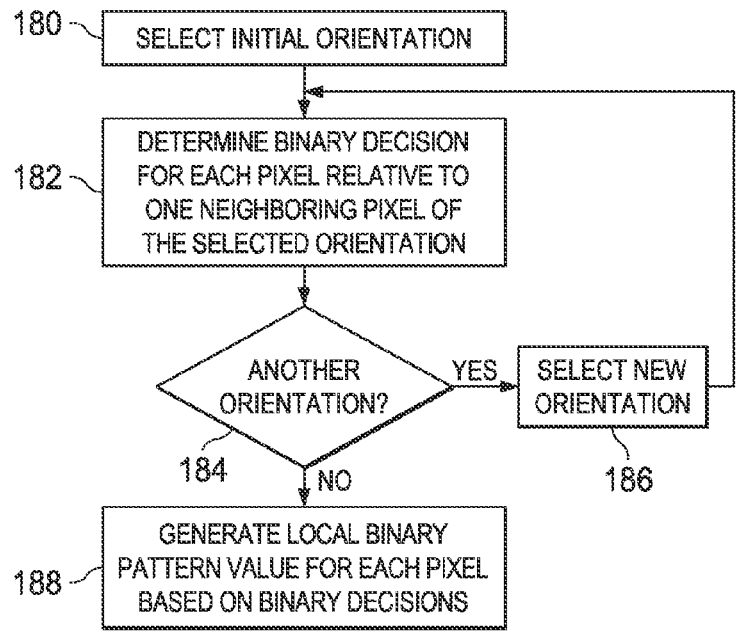
FIG. 4 shows a method for determining binary decisions for an LBP in accordance with the disclosed principles.

FIG. 4 illustrates a method for computing a local binary pattern (LBP) value for pixels of an image in accordance with the preferred embodiments. At 180, the method includes selecting an initial orientation (e.g., upper left). At 182, the method includes determining the binary decision for each pixel in the image (the "center" pixels) relative to one neighboring pixel of the selected orientation. For example, if the initially selected orientation is the upper left orientation, then each pixel in the image is compared to that pixel's upper left neighbor (within the radius R).

At 184, the method determines whether another orientation exists that has not yet been processed. In the case of P=8, there are eight orientations. If another orientation exists, then a new orientation is selected at 186 and control loops back to 182 at which the process of determining the binary decision for each pixel repeats for the new orientation. When all orientations have been processed, each pixel in the image will have been compared to all relevant neighboring pixels (e.g., 8 neighboring pixels), and at 188, the method includes generating the LBP value for each pixel based on the binary decisions for each such pixel. An example of the computation of the LBP value is discussed above with regard to FIGS. 2A-2D. The method of FIG. 4 compares each pixel in the image a neighboring pixel of the same orientation and sequencing through the various orientations.

Figure 5:
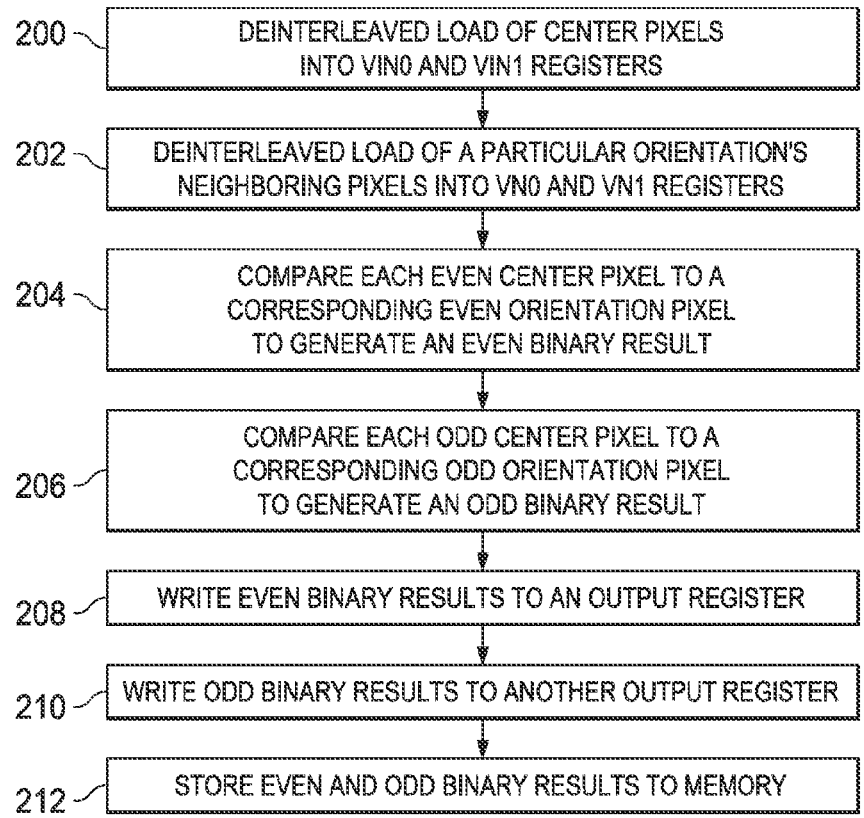
FIG. 5 shows additional detail as to how the binary decisions are determined in accordance with the disclosed principles.

FIG. 5 further illustrates the method of FIG. 4. FIG. 5 illustrates the comparison of each of a group of center pixels with a neighboring pixel of a particular orientation. Referring to FIG. 5, at 200 the method includes performing a deinterleaved load of center pixels (e.g., from WBUF 110) into register Vin0 and Vin1 in the vector coprocessor core 104 (also referred to herein as a vector processor). A deinterleaved load is a load from memory operation in which odd pixels (e.g., pixels 1, 3, 5, etc.) are separated from the even pixels (0, 2, 4, etc.). The vector processor 104 of a preferred embodiment is capable of performing deinterleaved loads and interleaved stores, but other embodiments of a vector processor need not perform deinterleaved loads/interleaved stores. The even pixels are loaded into register Vin0 and the odd pixels are loaded into register Vin1. References to a pixel being loaded, a pixel being stored, a pixel being compared to another pixel refer to the value of the pixel.

At 202, the method further includes performing a deinterleaved load of a particular orientation's neighboring pixels from memory (e.g., WBUF 110) into registers (e.g., registers designated as Vn0 and Vn1) in the vector processor 104. At this point and with 16 pixels being loaded from a memory by each deinterleaved load instruction, register Vin0 has eight even center pixels, register Vin1 has eight odd center pixels, register Vn0 has eight even neighboring pixels, and register Vn1 has eight odd neighboring pixels.

At 204, the vector processor 104 compares each even center pixel to a corresponding even neighboring pixel of the particular orientation to generate a binary result. For example, the binary result may be 1 if the center pixel is less than or equal to the neighboring pixel, or 0 if the center pixel is greater than the neighboring pixel.

Operation 206 is similar to that of 204 but is for the odd center and neighboring pixels (which are in different registers than in 204). At this point, the vector processor has made the binary decisions necessary for a LBP computation, but the even and odd binary decisions are deinterleaved due to the nature of the vector processor 104.

At 208, the even binary results are loaded into an output register (e.g., Vout0). At 210, the odd binary results are loaded into a different output register (Vout1). In some implementations, the vector processor 104 is capable of performing a "pack" instruction (VBITPK) for the even pixels as well as for the odd pixels. A pack instruction performs the comparison (204, 206), and writes the results to the output register (208, 210).

At 212, the even and odd binary results of the output registers Vout0 and Vout1 are stored back in memory.

Figure 6:
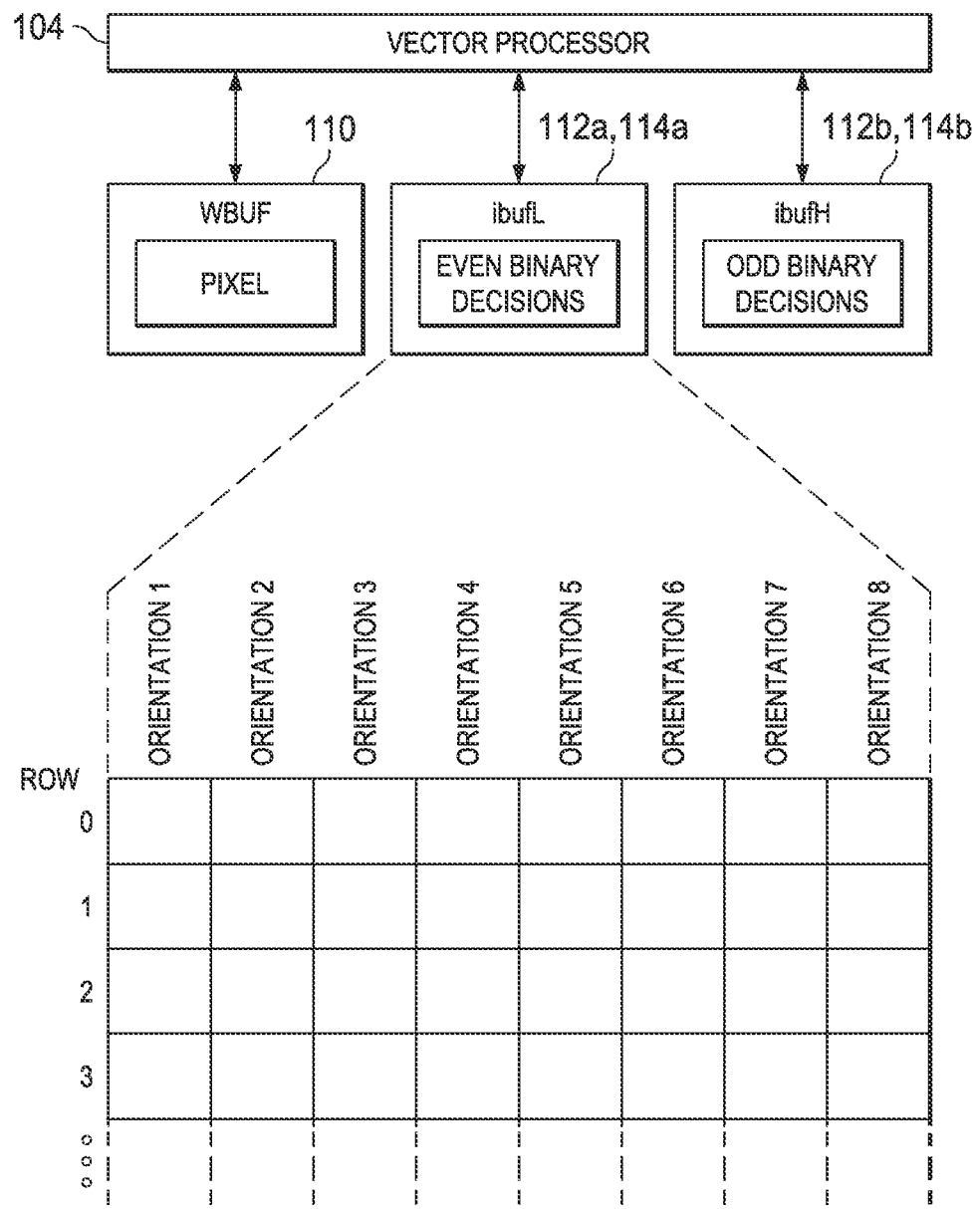
FIG. 6 illustrates the organization of the various memories in accordance with the disclosed principles.

As noted above, the process of FIG. 5 is repeated for the next group of center pixels and neighboring pixels of the same orientation as for the former group of center pixels. In some embodiments, the vector processor can load 256 bits of data from memory. The vector processor 104 may implement load buffering into each of its load units (not specifically shown in FIG. 3). FIG. 6 illustrates that the vector processor 104 of the preferred embodiment includes multiple ports (3 ports in the example of FIG. 6), each port connected to a different memory (WBUF, ibufL, and ibufH). The image pixel data may be stored in the WBUF 110 while the even results of the binary decisions are written to the ibufL 112a, 114b and the odd results of the binary decisions are written to the ibufH 112, 114b. Each of these memory buffers may be implemented as an n-bank memory. In the example described herein, n is 8 and thus each memory is organized into 8 banks.

FIG. 6 illustrates the organization of ibufL. Each row of the memory pertains to the binary decisions for a group of even center pixels. As described herein, groups of 8 even center pixels are processed concurrently and thus each row of ibufL contains the binary decisions for the same group of 8 center pixels. All P (e.g., 8) binary decisions for the same orientation of the pixels are stored together in one bank. Each bank is thus dedicated to store the binary decision results for a different orientation as shown. For example, row 0/bank 1 (orientation 1) is used to store the binary results for a particular group of even center pixels for one particular orientation. Row 0, bank 2 (orientation 2) is used to store the binary results for the same particular group of even center pixels but for a different orientation. All P binary decisions for one center pixel are distributed across the various banks in the same row. Each bank stores the binary decisions for all of the center pixels for the same orientation. The organization of ibufH is similar to that of ibufL but binary decision results for odd pixels are stored in ibufH.

Figure 7:
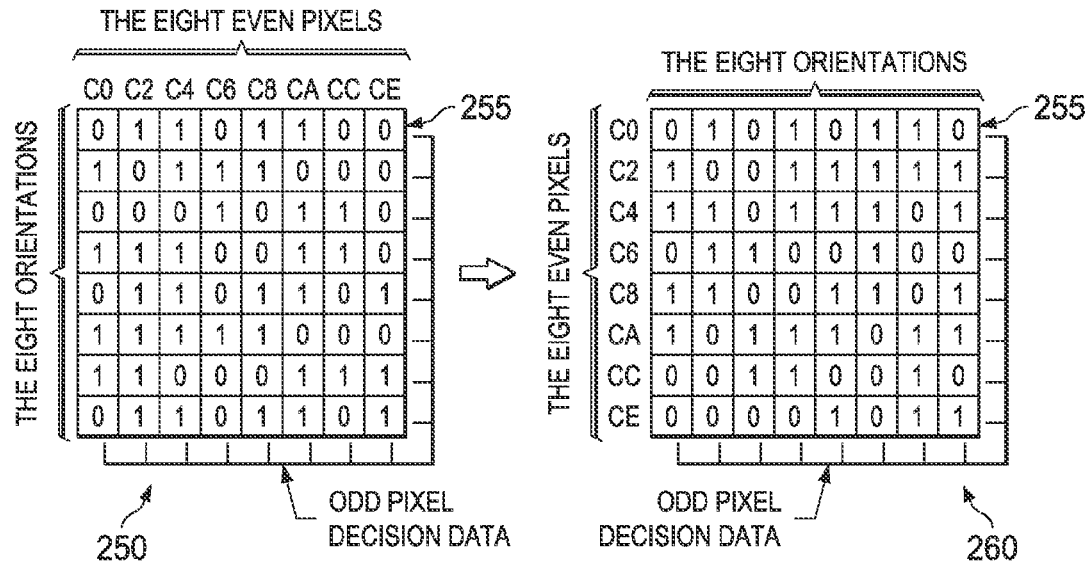
FIG. 7 illustrates the transpose operation in accordance with the disclosed principles.

For a group of 16 center pixels designated as C0, C1, C2, ..., CE, the even center pixels are designated as C0, C2, C4, C6, C8, CA, CC, and CE, and the odd center pixels are C1, C3, C5, C7, C9, CB, CD, and CF. FIG. 7 shows another representation of the binary decision results at 250 saved back to memory following the store instruction of 212 in FIG. 5. Each row of memory contains the binary results for a given orientation for the group of 8 even center pixels being processed. Thus, each column pertains to the same even center pixel. The binary results are still deinterleaved at this point into even and odd decision data. With regard to FIG. 6, the value in the first row of 250 (FIG. 7) is stored in row 0/orientation 1, the value in the second row of 250 is stored in row 0/orientation 2, and so on.

Two operations are performed on the binary decision data 250 of FIG. 7. One operation is a transpose operation to align the binary decisions for a given center pixel in the same row of memory. Another operation is to re-interleave the binary decisions so as assemble all 16 binary decisions in consecutive order for each center pixel.

Reference numeral 260 in FIG. 7 illustrates the organization of the binary decisions following the transpose operation. The first column (255), for example, has been transposed to the first row as shown. By transposing columns and rows, each row of the resulting array has all of the even/odd binary decisions for the same center pixel. Thus, the first row at 260 has all even binary decisions for center pixel C0, the second row has all even binary decisions for center pixel C2, and so on. The similar operation is performed on the odd pixel binary decisions as well. The vector processor 104 preferably includes transpose operation (e.g., VBITTR). After the binary decisions are transposed, the resulting binary decisions are written back to memory and re-interleaved in the process.

Figure 8:
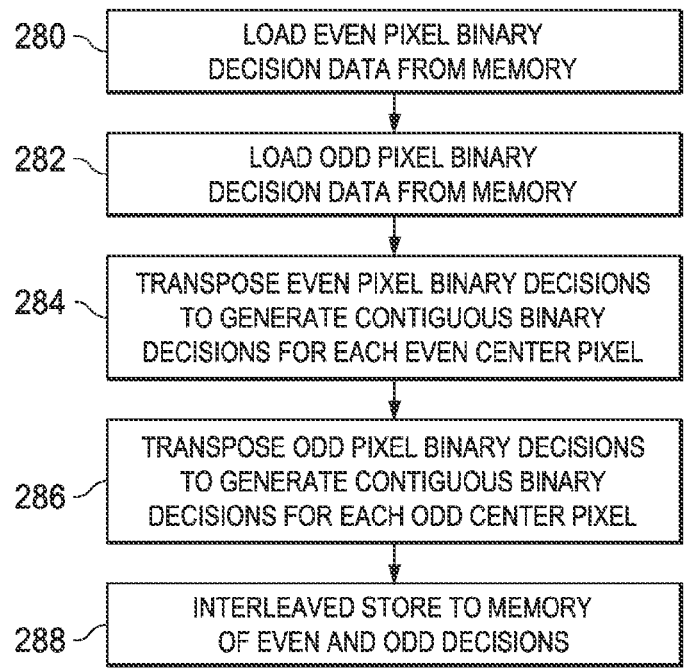
FIG. 8 shows additional detail regarding the transpose and interleaved store operations in accordance with the disclosed principles.

FIG. 8 illustrates a method for transposing and performing an interleaved store. At 280, the method includes loading even pixel binary decisions from memory. At 282, the method includes loading odd pixel binary decisions from memory. At 284, rows and columns of the even pixel binary decisions are transposed to generate contiguous binary decisions for each even center pixel. Operation 286 is similar and transposes rows and columns of the odd pixel binary decisions to generate contiguous binary decisions for each odd center pixel. The even and odd binary decisions are then stored back to memory with an interleaved store to arrange the binary decisions for each pixel in order. That is, all of the binary decisions for pixel C0 are arranged together, then the binary decisions for the next pixel C1, and so on.

With the implementations described herein, relatively few memory accesses are needed. For example, for P<=8, the memory access "cost" (cycles) is $1.5*P/16+1/16$. If P>8, some implementations may employ a second step of taking partial 8-bit LPS and shifting and Oring them. This extra step may add another $1/16$ cycles per additional 8-bit, so if P=8K, then the above cost equation becomes for P=16 and R=2: $1.5*P/16+R/8$ ($1/16$ for BITPK and $1/16$ for the extra step). For a typical case of P=8, the cyle cost is: $12/16+1/16=13/16=0.8125$ cycles.

The embodiments described herein can be applied to Features from Accelerated Segment Test (FAST) and Binary Robust Independent Elementary Features (e.g., rBrief) detectors as well.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of classification of an image including determining a local binary pattern in the image, comprising:
    selecting an orientation;
    for each pixel in the image, determining a binary decision for each such pixel relative to one neighboring pixel of the orientation, wherein determining the binary decision comprises:
    loading a plurality of center pixel data from a multi-bank memory into a vector processor across a plurality of lanes;
    loading a plurality of pixel data for neighboring pixels from the multi-bank memory into the vector processor across the plurality of lanes;
    performing a pack instruction in which each center pixel is compared to the corresponding orientation pixel data and binary results of the comparisons are written to an output register;
    after determining the binary decisions for the pixels of the image, selecting a new orientation;
    repeating the determination of the binary decision for each pixel in the image relative to one neighboring pixel of the newly selected orientation; and classifying the image corresponding to the determined local binary pattern.

2. The method of claim 1 wherein determining the binary decision for a particular pixel includes comparing that particular pixel to the neighboring pixel.

3. The method of claim 1 further comprising transposing the comparison results to form a value for each center pixel that includes results of multiple orientations.

4. The method of claim 1 wherein loading the plurality of center pixels includes performing a deinterleaved load by which even center pixels are loaded into one register and odd center pixels are loaded into a different register.

5. The method of claim 4 wherein performing the pack instruction comprises performing the pack instruction on even center and corresponding orientation pixels and separately performing the pack instruction on odd center and corresponding orientation pixels, and the method further comprises:
- transposing the comparison results for even pixels to form a first value for each even center pixel that includes results of multiple orientations;
- transposing the comparison results for odd pixels to form a second value for each odd center pixel that includes results of multiple orientations; and
- performing an interleaved store of the first and second values back to memory.

6. A system, comprising:
- a vector processor with multiple memory ports; and
- a plurality of memories, each memory coupled to the vector processor by way of a separate port;
- wherein a first of the memories stores pixel data, a second of the memories stores binary decision results pertaining to even pixels, and a third of the memories stores binary decision results of odd pixels; and
  - wherein the vector processor is operable to perform:
    - a deinterleaved load from the first memory by which even center pixels are loaded into one register and odd center pixels are loaded into a different register; and
    - a pack instruction in which each center pixel is compared to a corresponding orientation pixel data and binary results of the comparisons are written to an output register.

7. The system of claim 6 wherein the vector processor is configured to:
- select an orientation;
- for each pixel in an image, determine a binary decision for each such pixel relative to one neighboring pixel of the orientation.

8. The system of claim 7 wherein the vector processor is configured to:
- select a new orientation after determining the binary decisions for the pixels of the image for a previous orientation; and
- repeat the determination of the binary decision for each pixel in the image relative to one neighboring pixel of the newly selected orientation.

9. The system of claim 7 wherein the processor is to determine the binary decision for a pixel by comparing the pixel to a neighboring pixel.

10. The system of claim 6 wherein the vector processor is to perform the pack instruction by performing the pack instruction on even center and corresponding orientation pixels and separately performing the pack instruction on odd center and corresponding orientation pixels.

11. The system of claim 10 wherein the vector processor is to:
- transpose the comparison results for even pixels to form a first value for each even center pixel that includes results of multiple orientations; and
- transpose the comparison results for odd pixels to form a second value for each odd center pixel that includes results of multiple orientations.

12. The system of claim 11 wherein the vector processor is to perform an interleaved store of the first and second values back to memory.

13. A system, comprising:
- a vector processor with multiple memory ports; and
- a plurality of memories, each memory coupled to the vector processor by way of a separate port;
- wherein the vector processor is configured to:
  - select an orientation;
  - for each pixel in the image, determine a binary decision for each such pixel relative to one neighboring pixel of the orientation, wherein determining the binary decision comprises:
    - loading a plurality of center pixel data from a multi-bank memory into a vector processor across a plurality of lanes;
    - loading a plurality of pixel data for neighboring pixels from the multi-bank memory into the vector processor across the plurality of lanes;
    - performing a pack instruction in which each center pixel is compared to the corresponding orientation pixel data and binary results of the comparisons are written to an output register;
  - after determining the binary decisions for the pixels of the image, select a new orientation; and
  - repeat the determination of the binary decision for each pixel in the image relative to one neighboring pixel of the newly selected orientation.

14. The system of claim 13 wherein the vector processor is configured to transpose the comparison results to form a value for each center pixel that includes results of multiple orientations.

15. The system of claim 13 wherein the vector processor is configured to load the plurality of center pixels by performing a deinterleaved load by which even center pixels are loaded into one register and odd center pixels are loaded into a different register.

16. The system of claim 15 wherein the vector processor is configured to perform the pack instruction by performing the pack instruction on even center and corresponding orientation pixels and separately performing the pack instruction on odd center and corresponding orientation pixels, and the vector processor is further configured to:
- transpose the comparison results for even pixels to form a first value for each even center pixel that includes results of multiple orientations;
- transpose the comparison results for odd pixels to form a second value for each odd center pixel that includes results of multiple orientations; and
- perform an interleaved store of the first and second values back to memory.

* * * * *